(12) United States Patent
Peng et al.

(10) Patent No.: US 12,415,349 B2
(45) Date of Patent: Sep. 16, 2025

(54) MUG WRAPPING MACHINE FOR SUBLIMATION TRANSFER PRINTING

(71) Applicant: Shandong Meikeda Electronic Graphic Inc.

(72) Inventors: James Peng, Fremont, CA (US); Yuan Wei, Suzhou (CN)

(73) Assignee: SHANDONG MEIKEDA ELECTRONIC GRAPHIC INC. (CN)

( * ) Notice: Subject to any disclaimer, the term of this patent is extended or adjusted under 35 U.S.C. 154(b) by 94 days.

(21) Appl. No.: 18/454,290

(22) Filed: Aug. 23, 2023

(65) Prior Publication Data

US 2024/0092076 A1    Mar. 21, 2024

(51) Int. Cl.
*B41F 16/00*   (2006.01)

(52) U.S. Cl.
CPC ........ *B41F 16/0093* (2013.01); *B41F 16/006* (2013.01); *B41F 16/008* (2013.01); *B41F 16/0086* (2013.01); *B41F 16/0006* (2013.01)

(58) Field of Classification Search
CPC ................ B41F 16/0093; B41F 16/006; B41F 16/008; B41F 16/0086; B41F 16/0006
See application file for complete search history.

(56) References Cited

U.S. PATENT DOCUMENTS

| 4,874,454 | A | * | 10/1989 | Talalay | B65C 9/34 |
| | | | | | 156/481 |
| 5,382,313 | A | * | 1/1995 | Eminger | B41F 16/00 |
| | | | | | 269/271 |
| 2013/0153129 | A1 | * | 6/2013 | Polk | B65C 3/14 |
| | | | | | 156/215 |

FOREIGN PATENT DOCUMENTS

CN          1535844 A  * 10/2004  ............. B41M 5/26

* cited by examiner

*Primary Examiner* — Yaovi M Ameh
(74) *Attorney, Agent, or Firm* — Stetina Garred Brucker & Newboles (57) ABSTRACT

A mug wrapping machine for sublimation transfer printing includes a base plate, above which a clamping frame mounting plate, a pressing plate, an auxiliary plate and a lifting plate are sequentially arranged. A placing plate is arranged above the lifting plate, so that the lower surface of the placement plate is provided with guide posts passing through the lifting plate, the auxiliary plate, the holding plate and the mounting plate of the clamping frame, and the lower end of the guide column is fixed on the upper surface of the base plate. The mounting plate of the clamping frame is installed between the clamping plate and the front and rear ends of the upper surface of the pressing plate, respectively, with ear seats, and a circular center column is arranged between the two ear seats, and the two ends of the circular center column are respectively equipped with rotating plates.

10 Claims, 10 Drawing Sheets

MUG WRAPPING MACHINE FOR SUBLIMATION TRANSFER PRINTING

CROSS-REFERENCE TO RELATED APPLICATIONS

This application claims priority to Chinese Utility Patent Application No. 202211132695.X entitled "A MUG WRAPPING MACHINE FOR SUBLIMATION TRANSFER PRINTING" filed before China's National Intellectual Property Administration on Sep. 17, 2022, the entire contents of which are incorporated herein by reference.

STATEMENT RE: FEDERALLY SPONSORED RESEARCH/DEVELOPMENT

Not Applicable

BACKGROUND

1. Technical Field

The invention belongs to the technical field of sublimation printing equipment, in particular to a mug wrapping machine for heat transfer printing.

2. Related Art

Sublimation printing is an emerging printing process. The printing method of this process is divided into two parts: transfer film printing and transfer processing. Transfer film printing adopts dot printing, where the pattern is pre-printed on the surface of the film. The printed pattern is rich in layers, has bright colors, ever-changing, small color difference, has good reproducibility, can meet the requirements of the designer, and is suitable for mass production. The transfer printing process is handled by a thermal transfer machine (heating and pressing) to transfer the fine print on the transfer film. The pattern is transferred on the surface of the product, and the ink layer is integrated with the surface of the product after forming, which is realistic and beautiful, and greatly improves the grade of the product.

Before heating and pressurizing the heat transfer machine, it is necessary to wrap the outer wall of the mug with printed paper and transfer paper, so that the mug can be put into the sublimation machine for transfer processing. Because it is necessary to wrap two layers on the outer wall of the cup/product-attached paper, the efficiency of manual wrapping is low. Due to manual handling, the position of the decal paper on the inner side is easy to shift. When thermal transfer processing is performed, the printed pattern will deviate and affect the visual appeal of the cup body.

BRIEF SUMMARY

In order to solve the above-mentioned technical problems, the embodiments of the present invention provide a cup wrapping machine for heat transfer. The embodiments solve the problem of the low efficiency of manually wrapping the outer wall of the cup with decal paper and the transfer paper before the existing heat transfer, and due to manual handling making the position of the decal paper on the inner side easy to shift. When thermal transfer processing is performed, the printed pattern will deviate, which will affect the aesthetics of the cup body.

The technical scheme adopted in the embodiments of the present invention is as follows:

A mug wrapping machine for sublimation printing, comprising a base plate, above which a clamping frame mounting plate, a pressing plate, an auxiliary plate and a lifting plate are arranged in sequence, wherein a placing plate is arranged above the lifting plate. The lower surface of the lower surface may be provided with four guide posts passing through the lifting plate, the auxiliary plate, the pressing plate and the mounting plate of the clamping frame. The lower end of the guiding column may be fixed on the upper surface of the base plate. A clamping frame may be installed between the plates, and the front and rear ends of the upper surface of the pressing plate may be respectively provided with ear seats. A circular center column may be arranged between the two ear seats, and the two ends of the circular center column may be respectively equipped with rotating plates. The other end of the rotating plate may be connected with a rotating column, the two ends of the rotating column may be movably connected with the lifting plate through the guide plate, and the four corners of the lifting plate may be respectively movably connected with the clamping plate installed on the inside of the placing plate through the arc connecting plate.

Further, the mounting plate of the clamping frame, the pressing plate, the auxiliary plate, the lifting plate and the guide column may all slidingly connected. The connection between the mounting plate of the clamping frame and the pressing plate and between the auxiliary plate and the lifting plate may be respectively secured by screw inserts.

Further, a handle may be installed on the center column and one end of the rotation column, and the rotation column can rotate clockwise by 0-135 degrees with the center column as the center when the handle is turned.

Further, the number of clamping plates may be four, which are installed in pairs on the inner surfaces of the front and rear ends of the placement plate through rotating pins. With the rotating pins as the center of the circle, under the push of the arc-shaped connecting plate, the other end of the clamping plate can rotate the clamping cup toward the center of the plate.

Further, transfer paper may be placed on the upper surface of the placement plate, and the two ends of the transfer paper are respectively provided with rollers for being stuck in the slot at one end of the clamping plate. The upper surface of the transfer paper may be placed with printed paper.

Further, on the surface of the placing board and on the inside of the side boards at the front and rear ends, openings may be provided for the passage of the arc-shaped connecting board and the upper convex board of the lifting board.

Further, the clamping frame may adopt two "C" shaped steel plates, and the two steel plates may form a whole through the fixing clip installed by welding at the rear end, the stopper welded on the upper end of the steel plate and the supporting base plate. The above clamping frame may be provided with one end of the support base plate being clamped with a cup body.

Further, the rear end of the clamping frame may be provided with a clamping groove below the fixing clip. The support base plate may be located on one side of the baffle plate, and a support block may be provided above the support base plate. The inside of the clamping frame may installed with a mechanism. The bolt at the fixed position of the support block may be provided with a moving groove at the position where the support block is in contact with the bolt.

Further, a spring may be provided between the upper surface of the supporting bottom plate and the lower surface of the supporting block.

Further, the lower end of the clamping frame may be provided with a plurality of protrusions, and the inside of the mounting plate of the clamping frame and the pressing plate may be provided with slots corresponding to the protrusions.

Compared with the prior art, the embodiments of the present invention may have, among others, the following beneficial effects:

1. In the present invention, the decal paper and the transfer paper are placed on the top of the placement board in turn, and the roller shafts at both ends of the transfer paper are placed in the slots at the outer end of the clamping board. The lifting board and the placement board are raised by rotating the handle in contact with the cup body, and then through the blocking of the cup body. The placing plate cannot rise again with the lifting plate, so that the clamping plate inside the placing plate rotates under the action of the arc-shaped connecting plate. Together with the printed paper and transfer paper is wrapped on the outer wall of the cup body, which is easy to use, and after the decal paper and transfer paper are placed in place, there is no need to handle them again manually, which avoids the position of the inner decal paper from shifting, which affects the subsequent transfer effect, and ensures the integrity thermal transfer quality of the product.

2. The clamping groove at the rear end of the clamping frame of the present invention may be affixed on the outside of the object to be clamped, and the screw rods arranged at both ends of the clamp are manually rotated to make the screw rod descend to clamp the object, fix the whole device, and clamp One end below the frame is provided with a number of protrusions, and a card slot adapted to the protrusions is provided inside the mounting plate of the clamping frame and the pressing plate. Through the connection between the mounting plate of the clamping frame and the pressing plate, one end of the clamping frame is affixed between the two, which facilitates the installation of the overall position of the device.

3. The upper part of the clamping frame of the present invention is provided with a support block on one side of the baffle plate, a spring is provided between the support block and the lower support base plate, and the two sides of the support block are respectively provided with moving slots for bolts to be affixed. Therefore, the support block can rise upward under the guidance of the moving groove and the action of the spring. When the operator puts the cup body on the outside of the support block, the support block rises and can firmly clamp the main cup body from the inside. Under the action of the support block, the rising height of the support block can be adjusted independently with the inner diameter of the cup body, which is beneficial to adapt to the use of cup bodies of different sizes.

BRIEF DESCRIPTION OF THE DRAWINGS

These and other features and advantages of the various embodiments disclosed herein will be better understood with respect to the following description and drawings, in which like numbers refer to like parts throughout, and in which.

In the figures:
1—bottom plate, 2—clamping frame mounting plate, 21—screw sleeve, 3—holding plate, 31—ear seat, 32—circular column, 33—rotating plate, 34—rotating column, 4—auxiliary plate, 5—Lifting plate, 51—arc connecting plate, 52—guiding plate, 6—placement plate, 61—clamping plate, 62—rotating pin, 7—guide post, 8—clamping frame, 81—clamping groove, 82—fixing clip, 83—block, 84—support block, 85—support base plate, 86—spring, 87—bolt, 88—moving groove, 9—handle, 10—transfer paper, 11—printed paper, 12—cup body.

DETAILED DESCRIPTION

In order to enable those skilled in the art to better understand the present invention, the following will clearly and completely describe the technical solutions in the embodiments of the present invention. Obviously, the described embodiments are only a part of the present invention, rather than full examples. Based on the embodiments of the present invention, all other embodiments obtained by persons of ordinary skill in the art without making creative efforts shall fall within the protection scope of the present invention.

As shown in FIG. 1 to FIG. 10.

Figure 1:
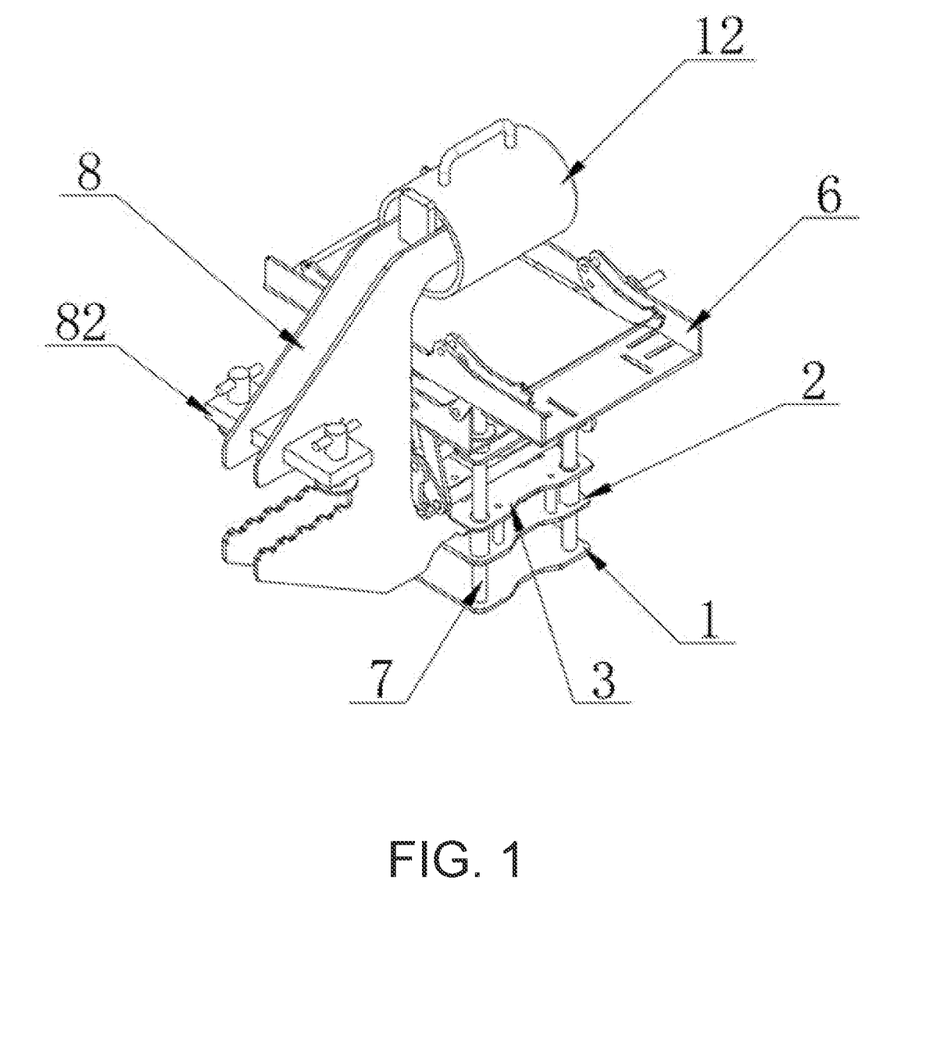
FIG. 1 is the overall structural representation of the present invention.
Figure 2:
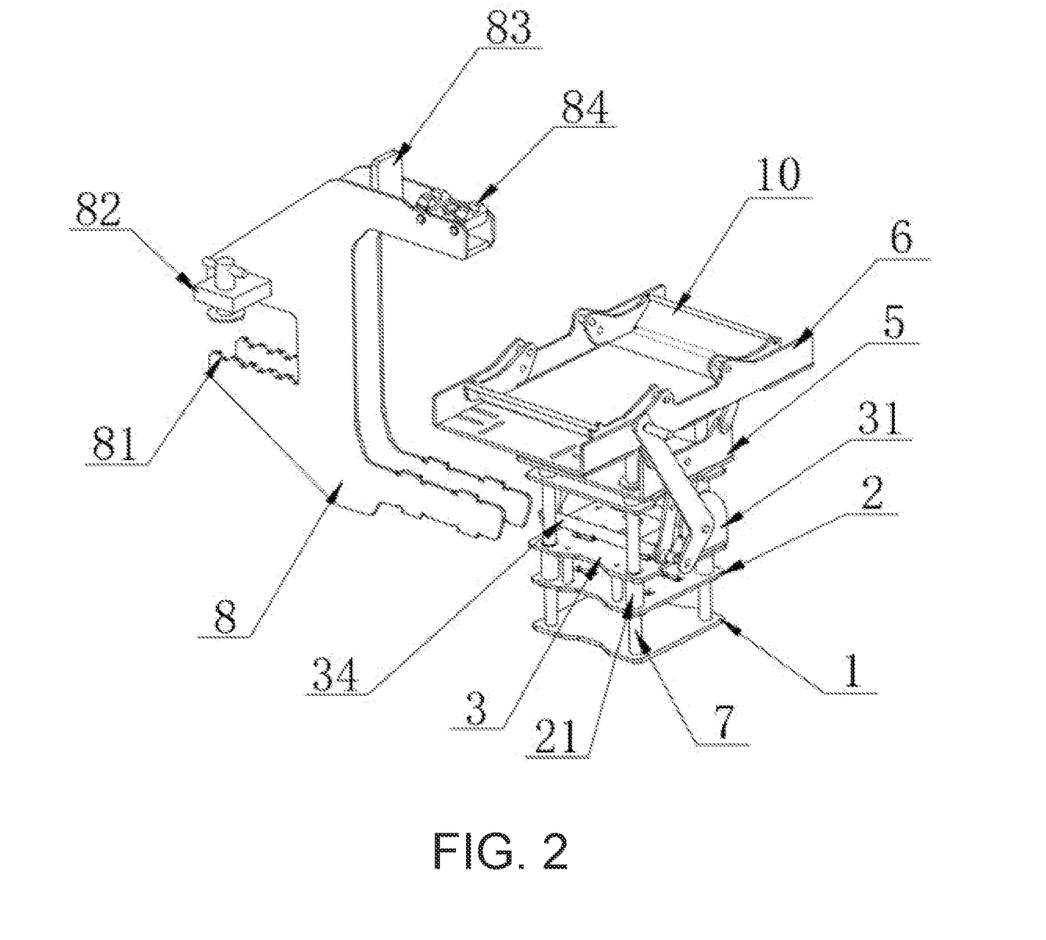
FIG. 2 is a structural schematic diagram of the present invention after the clamping frame is separated from the main body.
Figure 3:
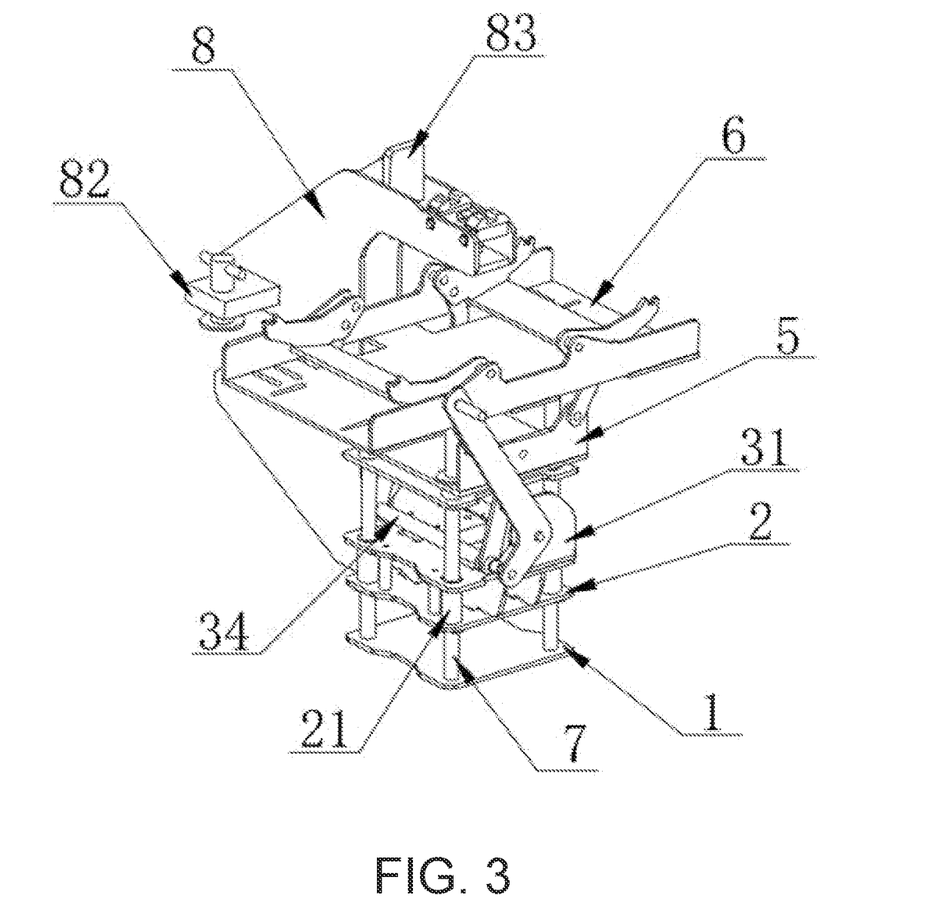
FIG. 3 is the three-dimensional structure schematic diagram of the present invention.

A cup wrapping machine for sublimation printing, comprises a base plate 1, above which there is a clamping frame mounting plate 2, a pressing plate 3, an auxiliary plate 4 and a lifting plate 5 are arranged in sequence. The lifting plate 5 is coupled to a placing plate 6. The lower surface of the placed plate 6 is provided with four guide posts 7 that passes through the lifting plate 5, the auxiliary plate 4, the pressing plate 3 and the clamping frame mounting plate 2. The lower end of the guide post 7 is fixed on the upper surface of the bottom plate 1. A clamping frame 8 is installed between the clamping frame mounting plate 2 and the pressing plate 3. The front and rear ends of the upper surface of the pressing plate 3 are respectively provided with ear seats 31. A circular center post 32 is arranged between the eat seats 31. A rotary plate 33 is installed at the two ends of the circular center post 32 respectively. The other end of the rotary plate 33 is connected to a rotary column 34, and the two ends of the rotary column 34 are connected by a guide plate 52. The lifting plate 5 is movably connected, and the four corners of the lifting plate 5 are respectively movably connected with the clamping plate 61 installed on the inner side of the placing plate 6 through arc-shaped connecting plates 51.

Figure 8:
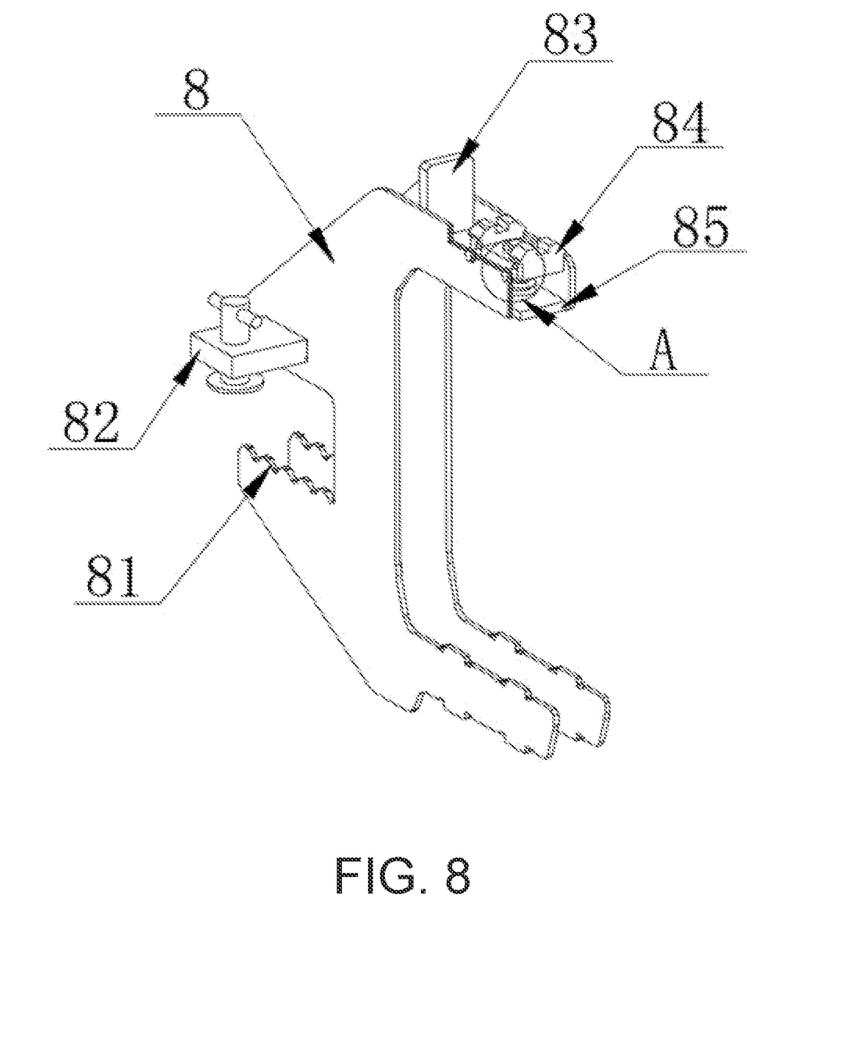
FIG. 8 is a schematic structural view of the clamping frame in the present invention.
Figure 9:
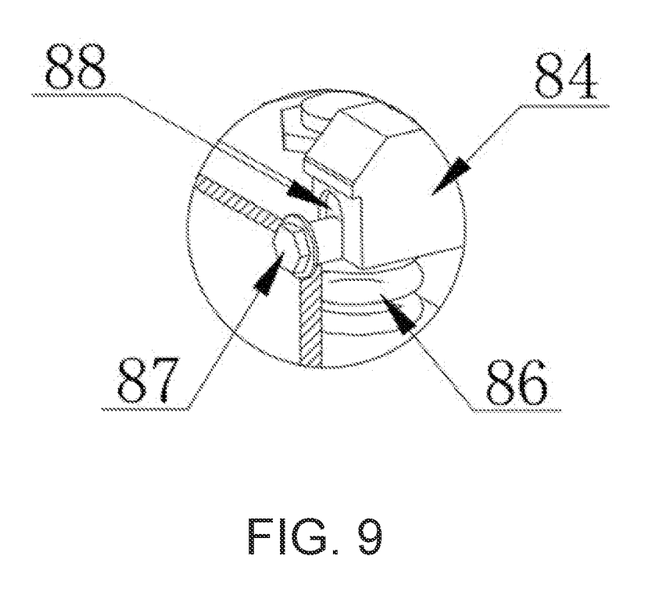
FIG. 9 is an enlarged schematic diagram of the structure at A in FIG. 8 of the present invention.

Preparation:

First, the whole device is fixed on the edge of the table board or other clampable positions through the clamping frame 8. The fixing method is to clamp the clamping groove at the rear end of the clamping frame 8 on the outside of the object to be clamped, and manually rotate the fixing clamp 82. The screw rods arranged at the inner two ends make the screw rods descend to clamp the object and fix the whole device.

Figure 10:
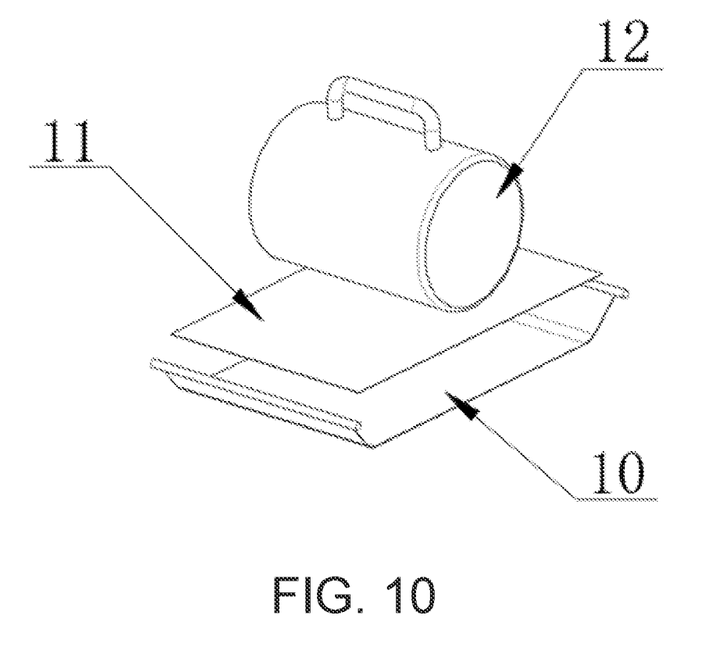
FIG. 10 is a schematic diagram of the positions and structures of decal paper and transfer paper in the present invention.

In the case, the transfer paper 10 is placed on the upper surface of the placement plate 6, the roller shafts at the two ends of the transfer paper 10 are placed in the slot at one end of the clamping plate 61, and the patterned paper 11 is placed on the transfer paper 10. On the top of the printing paper 10, the pattern of the decal paper 11 can be selected according to the requirements. Finally, the smooth cup body 12 is placed on the end of the support block 84 above the clamping frame 8. At this time, the cup body 12 is located on the front of the decal paper 11 above, and the cup handle in the placed cup body 12 faces upward, as shown in FIG. 1.

Figure 7:
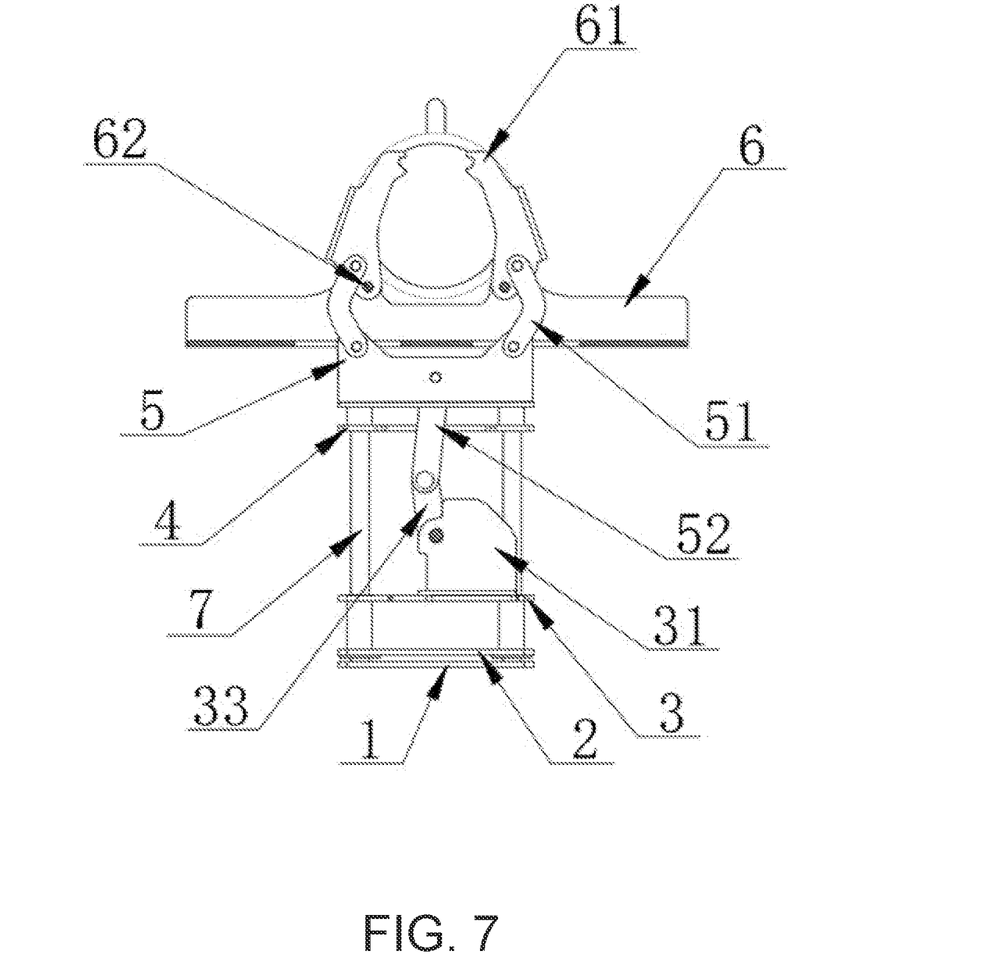
FIG. 7 is a schematic diagram of the position change of the rotating plate and the guide plate in the present invention.

The preparatory work is completed, now clockwise, with the center column 32 as the center of the circle, the handle 9 is rotated so that the state between the rotating plate 33 and the guide plate 52 gradually becomes a straight line, thereby pushing the lifting plate 5 upwards. Because the auxiliary plate 4 and the lifting plates 5 are fixed by screw sleeves 21, so the auxiliary plate 4 and the lifting plate 5 rise synchronously. During the upward movement of the lifting plate 5, first the lifting plate 5 is connected to the placement plate 6 through the arc-shaped connecting plate 51. This contact pushes the position of placing plate 6 to also move upwards, and because placing plate 6 is connected with base plate 1 by guide post 7, the base plate 1 rises synchronously.

Figure 4:
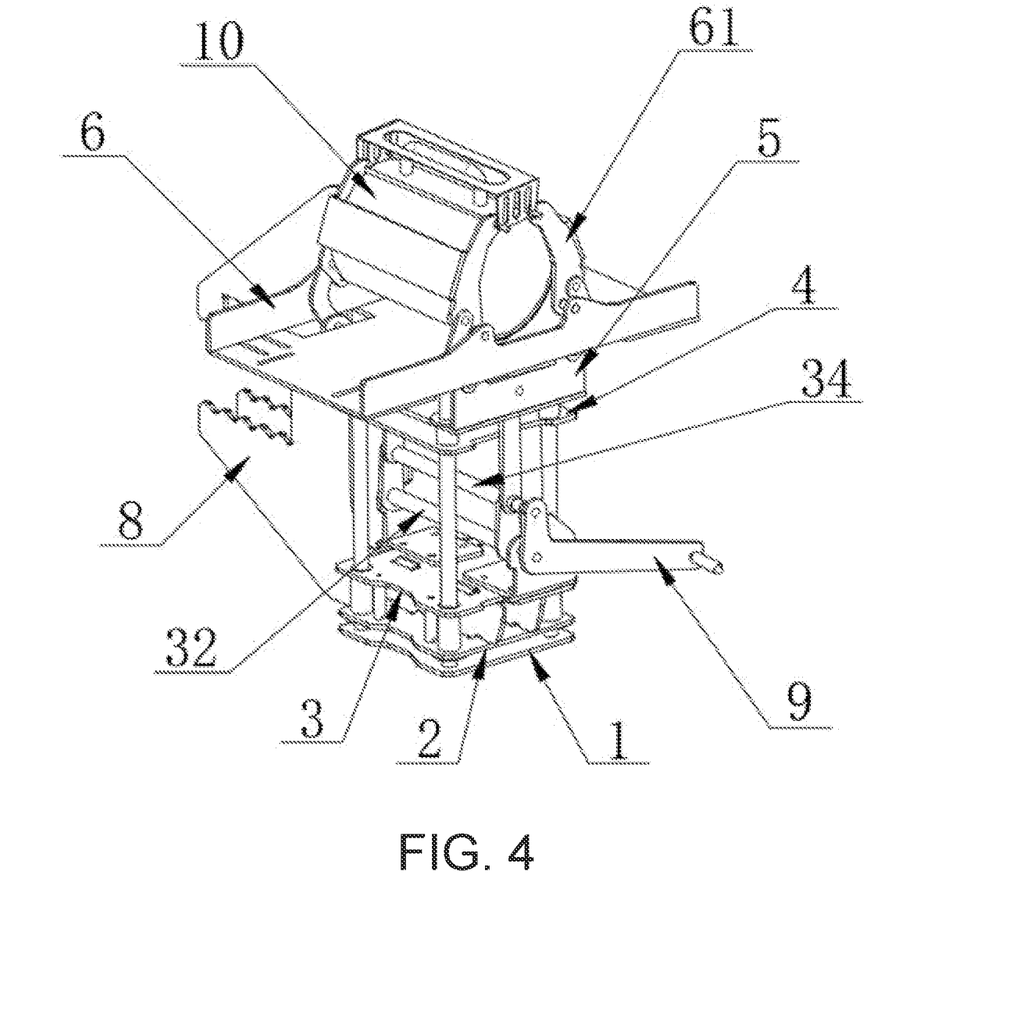
FIG. 4 is a schematic structural view of the cup clamped by the clamping plate of the present invention.
Figure 5:
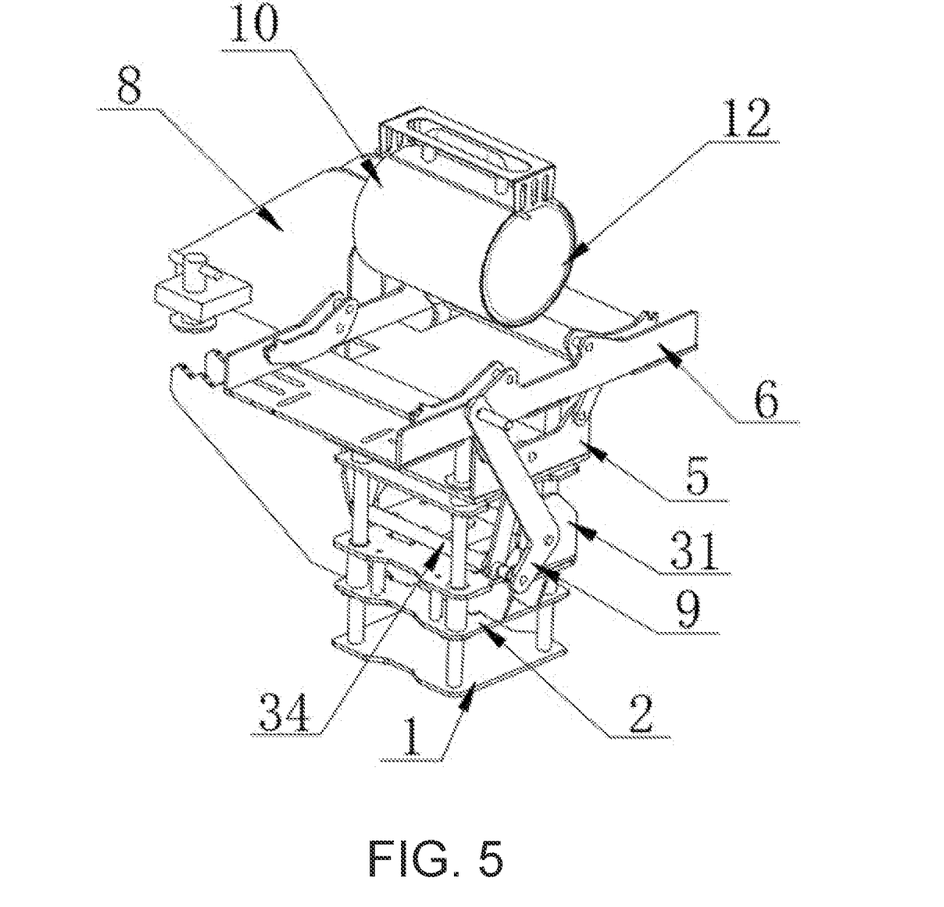
FIG. 5 is a schematic structural view of the present invention after placing the cup body.
Figure 6:
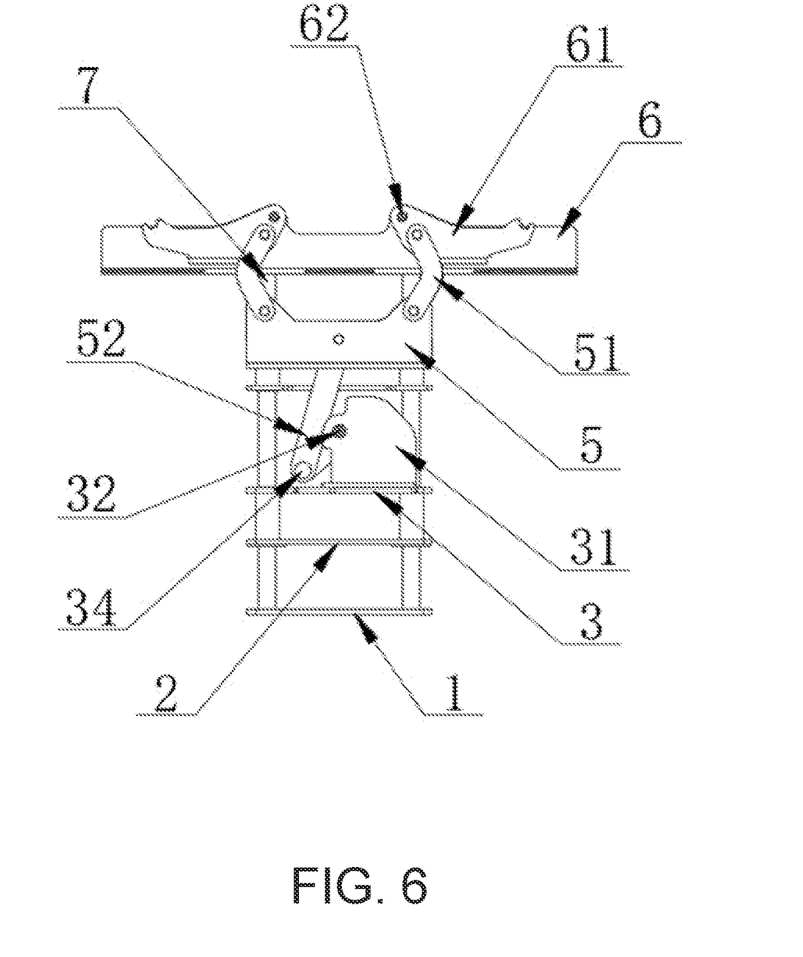
FIG. 6 is a schematic diagram of the position and structure of the clamping plate in the present invention.

When the placing plate 6 rises and touches the cup body 12, the placing plate 6 was not rising due to the blocking of the cup body 12, but the inside of the placing plate 6 was provided with an opening for the upper end of the lifting plate 5 to pass through, so the lifting plate 5 still can rise one end distance. At this moment lifting plate 5 rises, and under the state that places plate 6 remains motionless, the thrust that arc-shaped connecting plate 51 applies to clamping plate 61 increases, and clamping plate 61 can rotate pin. The position of 62 is the center of the circle, and the other end is rotated toward the position of the cup body 12, and the transfer paper 10 and the decal paper 11 are wrapped on the outside of the cup body 12. At this time, the roller shafts at both ends of the transfer paper 10 are fixed, with both ends of the fixing frame being provided with arc-shaped grooves for clamping the roller shaft so that the transfer paper 10 can still be kept in the state of wrapping the cup body 12 after the cup body 12 is removed, awaiting the subsequent thermal transfer process use.

The handle 9 is rotated in the opposite direction, and the positions of the lifting plate 5, the placing plate 6 and the clamping plate 61 return to their original positions and can be used continuously.

Utilize the technical solution described in the present invention, or those skilled in the art design a similar technical solution under the inspiration of the technical solution of the present invention, and achieve the above-mentioned technical effects, all fall into the protection scope of the present invention.

What is claimed is:

1. A mug wrapping machine for sublimation printing, comprising:
    a bottom plate;
    a clamping frame mounting plate;
    an auxiliary plate;
    a pressing plate;
    lifting plates;
    a placement plate coupled to the lifting plate, a lower surface of the placement plate provided with guide posts, the guide posts passing through the lifting plate, the auxiliary plate, the clamping plate, and the clamping frame mounting plate, lower ends of the guide posts being fixed on an upper surface of the bottom plate;
    clamping frames installed between the clamping frame mounting plate and the pressing plate;
    ear seats on front and rear ends of an upper surface of the pressing plate;
    a central column inserted to the ear seats;
    a rotating plate coupled to the central column;
    a rotating column coupled to the rotating plate;
    a placing plate;
    arc connecting plates;
    a guide plate coupled to the rotating column and connected to the lifting plates, each of the lifting plates being connected to an inner side of the placing plate through the arc connecting plate; and
    one or more clamping plates flexibly connected to the guide plate.

2. The mug wrapping machine for sublimation printing of claim 1, wherein the clamping frame mounting plate, the pressing plate, the auxiliary plate and the lifting plate are slidingly connected with the guide posts with screw sleeves in a fixed connection.

3. The mug wrapping machine for sublimation printing of claim 1, further comprising a handle installed on one end of the central column and the rotating column, rotation of the handle with the center column as center, effectuates a clockwise rotation of the rotating column by 0-135 degrees.

4. The mug wrapping machine for sublimation printing of claim 1, wherein the number of the clamping plates is four, and are installed in pairs before and after the placing plate through rotating pins, inner surfaces of both ends of the clamping plates are rotatable toward the center of the placing plate to clamp a workpiece under a push of the arc-shaped connecting plate.

5. The mug wrapping machine for sublimation printing of claim 1, wherein transfer paper is placed on the upper surface of the placement plate, a roller shaft being positioned at ends of the transfer paper and affixed in a slot at one end of the clamping plate, decal paper being placed on an upper surface of the transfer paper.

6. The mug wrapping machine for sublimation printing of claim 1, wherein a surface of the placement plate and the inner sides of the side plates at the front and rear ends are provided with the arc-shaped connecting plates and define an opening through which the convex plate at the upper end of the lifting plate passes.

7. The mug wrapping machine for sublimation printing of claim 1, wherein the clamping frame includes one or more C-shaped plates, and the C-shaped steel plates are fixed clips installed by attaching at a rear end and a block attached on an upper end of the C-shaped plate and a support base plate form a whole, and one end of the support base plate above the clamping frame is provided with a workpiece.

8. The mug wrapping machine for sublimation printing of claim 7, wherein the rear end of the clamping frame and below the fixing clamp is provided with a clamping groove, the support base plate is located on one side of the block, and a support block is provided above the support base plate, and the support block is installed inside the clamping frame, a position where the support block contacts the bolt is provided with a moving slot.

9. The mug wrapping machine for sublimation printing of claim 8, further comprising a spring provided between the upper surface of the supporting base plate and the lower surface of the support block.

10. The mug wrapping machine for sublimation printing of claim 1, wherein one end below the clamping frame is provided with several protrusions, and the mounting plate of the clamping frame is in contact with a press, an inside of the holding plate being provided with a card slot adapted to the protrusion.

* * * * *

UNITED STATES PATENT AND TRADEMARK OFFICE
CERTIFICATE OF CORRECTION

| | | |
|---|---|---|
| PATENT NO. | : 12,415,349 B2 | Page 1 of 1 |
| APPLICATION NO. | : 18/454290 | |
| DATED | : September 16, 2025 | |
| INVENTOR(S) | : James Peng and Yuan Wei | |

It is certified that error appears in the above-identified patent and that said Letters Patent is hereby corrected as shown below:

On the Title Page

Item (30) the foreign priority data should be included as follows:
Foreign Application Priority Data
Sept. 17, 2022 (CN).........................202211132695.X Signed and Sealed this
Fourth Day of November, 2025

John A. Squires
*Director of the United States Patent and Trademark Office*